(12) United States Patent
Ishii

(10) Patent No.: US 7,801,064 B2
(45) Date of Patent: Sep. 21, 2010

(54) WIRELESS DEVICE AND NETWORK SYSTEM

(75) Inventor: Yosuke Ishii, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 7 days.

(21) Appl. No.: 11/662,204

(22) PCT Filed: Aug. 28, 2006

(86) PCT No.: PCT/JP2006/316839
§ 371 (c)(1),
(2), (4) Date: Mar. 8, 2007

(87) PCT Pub. No.: WO2007/058008
PCT Pub. Date: May 24, 2007

(65) Prior Publication Data
US 2009/0080347 A1      Mar. 26, 2009

(30) Foreign Application Priority Data
Nov. 16, 2005   (JP)   ............... 2005-331751

(51) Int. Cl.
*H04B 7/00* (2006.01)
(52) U.S. Cl. .................. 370/310; 370/256; 370/408
(58) Field of Classification Search ......... 370/216–225, 370/256, 310, 408
See application file for complete search history.

(56) References Cited

U.S. PATENT DOCUMENTS

2003/0076840 A1 * 4/2003 Rajagopal et al. ...... 370/395.21
2003/0235158 A1 * 12/2003 Lee et al. .................. 370/256
2004/0156345 A1 * 8/2004 Steer et al. ................ 370/338
2005/0135379 A1 * 6/2005 Callaway et al. ....... 370/395.31

FOREIGN PATENT DOCUMENTS

| JP | 3010157 B1 | 12/1999 |
| JP | 2000-78147 A | 3/2000 |
| JP | 2005-94529 A | 4/2005 |

OTHER PUBLICATIONS

Moy; OSPF Version 2; Network Working Group; Apr. 1998.*
JP Notification of Reason for Refusal, dated May 11, 2010, issued in corresponding JP Application No. 2005-331751, 4 pages in English and Japanese.

* cited by examiner

*Primary Examiner*—Kent Chang
*Assistant Examiner*—Kashif Siddiqui
(74) *Attorney, Agent, or Firm*—Sughrue Mion, PLLC

(57) ABSTRACT

It is to improve the robustness and the data transfer reliability of a network.

When the destination node is the sixty sixth wireless device D66, the second wireless device D2 determines that there is no destination node among neighboring nodes based on the parent-and-child-node information of the first neighboring node information to transfer the data to the first wireless device D1 as a parent node. The first wireless device D1 can communicate within a communicable range AR1 and memorizes network information of the zeroth wireless device D0, the second wireless device D2, the seventh wireless device D7, the eighth wireless device D8, and the seventeenth wireless device D17. The first wireless device D1 determines that the sixty sixth wireless device D66 as a destination node exists at the neighborhood of the seventh wireless device D7 to transfer the data to the seventh wireless device D7. Then, the seventh wireless device D7 determines that the sixty sixth wireless device D66 as a neighboring node is the destination node to transfer the data to the device.

7 Claims, 10 Drawing Sheets

WIRELESS DEVICE AND NETWORK SYSTEM

TECHNICAL FIELD

The present invention relates to a wireless device connected to a plurality of hierarchized wireless devices via a network and a network system having the plurality of wireless devices.

BACKGROUND ART

Recently, as wireless networks are spread, the lower cost and the lower power consumption of the networks have been desired. As a network formation realizing the lower cost and lower power, a multihop wireless network (hereinafter simply referred to as "multihop network") has been known. The multihop network has a network formation that uses only wireless devices (hereinafter may be referred to as "wireless device") having a wireless communication function to perform wireless communication by a multistage hookup and relay method and to provide an autonomous decentralized network.

One of multihop networks is a tree network. The tree network is formed by hierarchizing a plurality of wireless devices through multistage connection to establish a parent-child relationship among the devices.

FIG. 10 is a schematic view of a network system S100 forming a tree network by the first to eighth wireless devices D1 to D8. Here, data is transferred from the eighth wireless device D8 to the first wireless device D1 by the method as described below.

First, because the eighth wireless device D8 does not have a wireless device at a lower layer, the eight wireless device D8 transfers data to the fifth wireless device D5 at a higher layer. The fifth wireless device D5 confirms that the first wireless device D1 does not exist at the lower layer thereof and transfers the data to the second wireless device D2 at a higher layer. Similarly, the second wireless device D2 confirms that the first wireless device D1 does not exist at the lower layer thereof and transfers the data to the first wireless device D1 at a higher layer. The first wireless device D1 confirms that the transferred data is addressed to itself to perform a data reception processing.

As described above, the tree network having a hierarchical network can have an increased number of wireless devices by further hierarchization and is useful for the formation of a wide area network. According to an example of a known tree network, based on the time at which a parent node positioned above a node (wireless device) in the tree carries out the communication, a time slot for performing a carrier sense for data transmission by the node thereof is determined based on the value of ID of this node to avoid a communication collision (see Patent Publication 1).

Patent Publication 1: Japanese Patent Unexamined Publication No. 2005-94529

DISCLOSURE OF THE INVENTION

Problem to be Solved by the Invention

However, for example, when disturbance, such as hardware failure, is caused in the second wireless device D2 of FIG. 10 or when radio disturbance or obstacle is caused between the second wireless device D2 and the fifth wireless device D5, the fifth, seventh, and eighth wireless devices D5, D7, and D8 are prevented from carrying out the communication not only with the second wireless device D2 but also with other devices such as the first wireless device D1 and the third wireless device D3.

As described above, in the case of the tree network, when disturbance is caused in a wireless device at a higher layer or when the communication with the wireless device is blocked to cause a communication failure, all devices at the lower layers of the wireless device in which the communication failure is caused, are cut off from the entire network.

In case that a wireless device is provided in a fixed manner in particular, the communication path is fixed when the network is formed. However, the communication quality tends to be unstable when the communication environment changes. Thus, the network is vulnerable to disturbance to the communication path and is difficult to be recovered.

In the case of a so-called bucket-brigade multihop network, the number of wireless devices through which data is transferred, i.e., hop number, is desirably fewer in order to improve the reliability of the data transfer. However, because the hierarchy structure of the tree network is established when the network is formed, data must be transferred via a vastly indirect communication path, for example, like a case where data is transferred from the eighth wireless device D8 to the sixth wireless device D6 as a destination. Therefore, an area of the search of wireless devices as destinations is expanded and the hop number is increased. As a result, the reliability of the data transfer is deteriorated.

Due to the above-described reasons, it has been difficult to secure the robustness (strength) and reliability of the network. Thus, even in a case of a tree network effective to a wide area network, the tree network has been difficultly used when the communication environment dynamically changes due to the movement of persons, machines or the like in a plant design or an in-building network for example. As a result, applications within which the tree network can be used, have been narrower.

The present invention has been made in view of the above-described problems. An object of the present invention is to improve the robustness of a network and the reliability of data transfer.

Means for Solving the Problem

In order to solve the above-problems, according to the present invention, a wireless device connected to a plurality of hierarchized wireless devices via a network, comprises:

an acquisition unit for acquiring network information of another communicable device in advance;

a destination determination unit for determining whether the another communicable device is a data transmission destination or not, based on the network information acquired by the acquisition unit; and a transmission control unit for transmitting data to the another communicable device when the destination determination unit determines that the another communicable device is the data transmission destination, and for transmitting the data to another device connected at a higher layer or a lower layer via the network when the destination determination unit determines that the another communicable device is not the data transmission destination.

Preferably, the wireless device further comprises:

a transmittability determination unit for determining whether the data can be transmitted to each of other devices connected at the higher layer and at the lower layer via the network, wherein the transmission control unit transmits the data to the another communicable device based on the network information when the transmittability determination unit determines that the data cannot be transmitted to the another device at the higher layer or at the lower layer.

Preferably, when there are a plurality of other communicable devices, the transmission control unit selects one communicable device in which a wireless device connected at a higher layer of the one communicable device via the network is different from a wireless device connected at the higher layer of the wireless device of the transmission control unit via the network, and transmits the data to the selected communicable device.

Preferably, when there are a plurality of the selected communicable devices, the transmission control unit further selects a communicable device connected at a layer having a minimum layer number in a hierarchy via the network, from among the selected communicable devices, and transmits the data to the selected communicable device.

Preferably, when there are a plurality of the selected communicable devices, the transmission control unit further selects a communicable device having best communication sensitivity, from among the selected communicable devices, and transmits the data to the selected communicable device.

Preferably, the network information comprises at least one of: network addresses of wireless devices connected to the another communicable device at the higher layer and the lower layer via the network; layer number of the another communicable device in a hierarchy of the network; and a network address of a wireless device to which the another communicable device can communicate.

Preferably, the network connection is a connection formed by a tree network.

According to the present invention, in a network system in which a plurality of hierarchized wireless devices are connected to via a network, each of the wireless devices comprises:

an acquisition unit for acquiring network information of another communicable device capable of communicating with the wireless device in advance;

a destination determination unit for determining whether the another communicable device is a data transmission destination or not, based on the network information acquired by the acquisition unit; and a transmission control unit for transmitting the data to the another communicable device when the destination determination unit determines that the another communicable device is the data transmission destination, and for transmitting the data to another device connected at a higher layer or a lower layer via the network when the destination determination unit determines that the another communicable device is not the data transmission destination.

EFFECT OF THE INVENTION

According to the present invention, based on the network information of another communicable device, which is acquired in advance, when it is determined that another communicable device is the data transmission destination, data is transmitted to another communicable device. When it is determined that another communicable device is not the data transmission destination, the data is transmitted to another device connected at a higher layer or a lower layer via the network. Thus, when another device as a data transmission destination can communicate, the data can be transmitted to the destination without hooking up to another device connected to the network. Therefore, an efficient communication path having a small hop number at the data transfer can be selected and it is possible to improve the reliability of the data transfer.

When it is determined that the data cannot be transmitted to another device at the higher layer or at the lower layer, the data is transmitted to another communicable device. Thus, for example, in case that the data transfer cannot be carried out by using the hierarchy structure of the network when the communication with another device connected via the network cannot be performed, the data is transmitted to another communicable device. Therefore, a redundant communication path can be provided. As a result, it is possible to prevent the entire network from being cut off by the communication failure, and to improve the robustness and the data transfer reliability of the network.

When there are a plurality of other communicable devices, the communicable device in which a wireless device connected at a higher layer of the communicable device via the network is different from a wireless device connected at the higher layer of the wireless device of the transmission control unit via the network, is selected. As a result, by transmitting the data to a wireless device that is not connected via the network to the wireless devices provided at the higher layer of the wireless device of the transmission control unit, the area in which a wireless device as a destination is searched is changed and it is possible to efficiently select a communication path to the destination.

When there are a plurality of selected other devices, a device connected at a layer having the minimum layer number in a hierarchy via the network is further selected from among the other devices. Thus, the data can be transmitted to a higher layer in the hierarchy structure. In the hierarchical network, a wireless device as a destination can be easily searched by selecting a communication path in an order from a higher layer to a lower layer. Thus, a communication path to the destination can be efficiently selected.

When there are a plurality of the selected other devices, another device having the best communication sensitivity is selected from among the other devices. Thus, data transmission can be performed more securely.

The network information includes at least any of: network addresses of wireless devices connected to the another communicable device at the higher layer and the lower layer via the network; layer number of the another communicable device in a hierarchy of the network; and a network address of a wireless device to which the another communicable device can communicate. Thus, a communication path can be appropriately selected based on the above network information.

The network connection is formed by a tree network. Thus, it is possible to provide a wide area network having the high robustness and the high data transfer reliability.

BEST MODE FOR CARRYING OUT THE INVENTION

Embodiment

Figure 1:
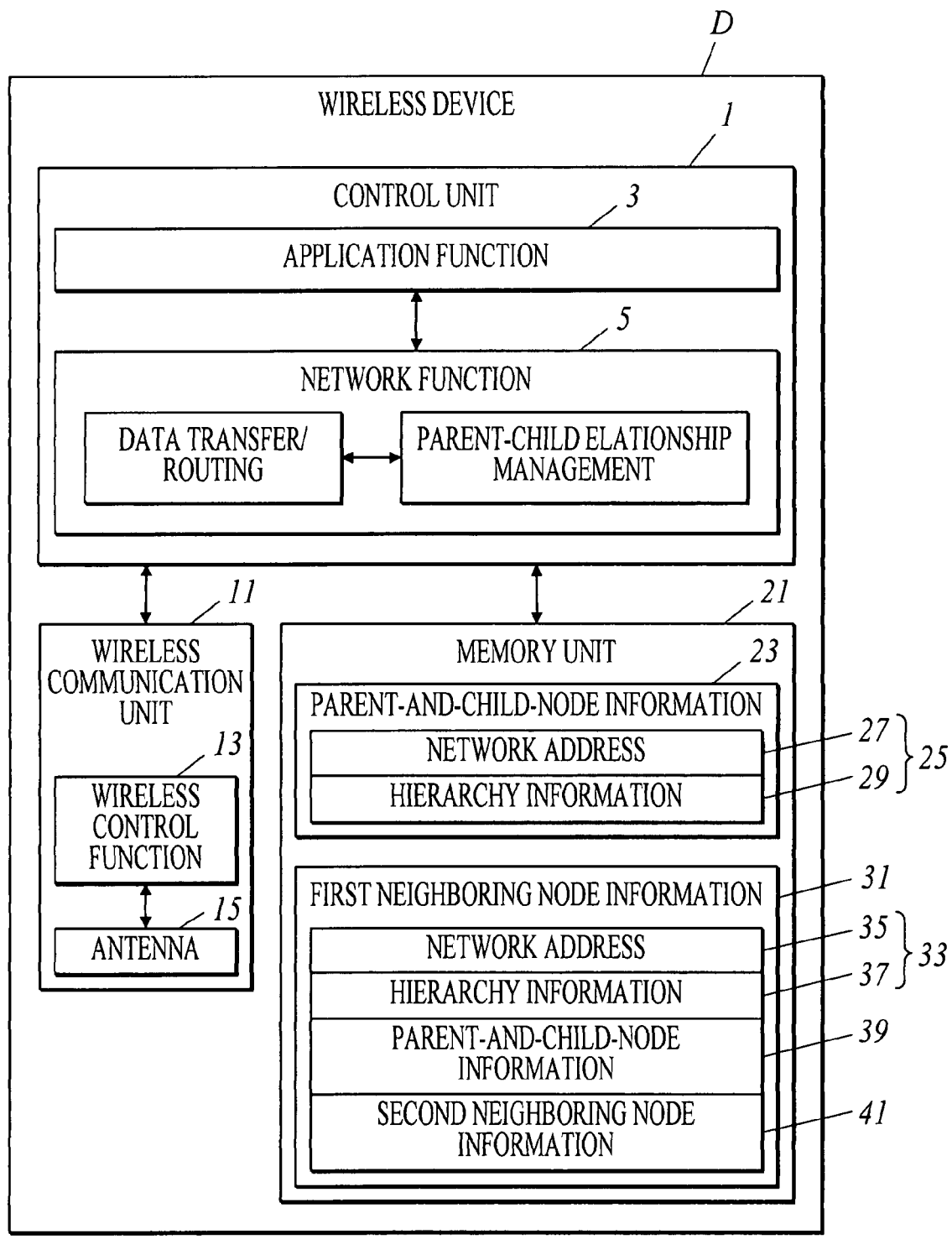
FIG. 1 This is a block diagram illustrating an example of a functional structure of a wireless device.

Hereinafter, an embodiment in which a wireless device of the present invention is applied to a wireless device D shown in FIG. 1 will be described in detail with reference to FIG. 1 to FIG. 9. It is noted that the wireless device D generically represents communication devices, such as wireless hub, router or the like, and electronic devices having various wireless communication functions, such as notebook computer, Personal Digital Assistance (PDA) or the like.

Figure 2:
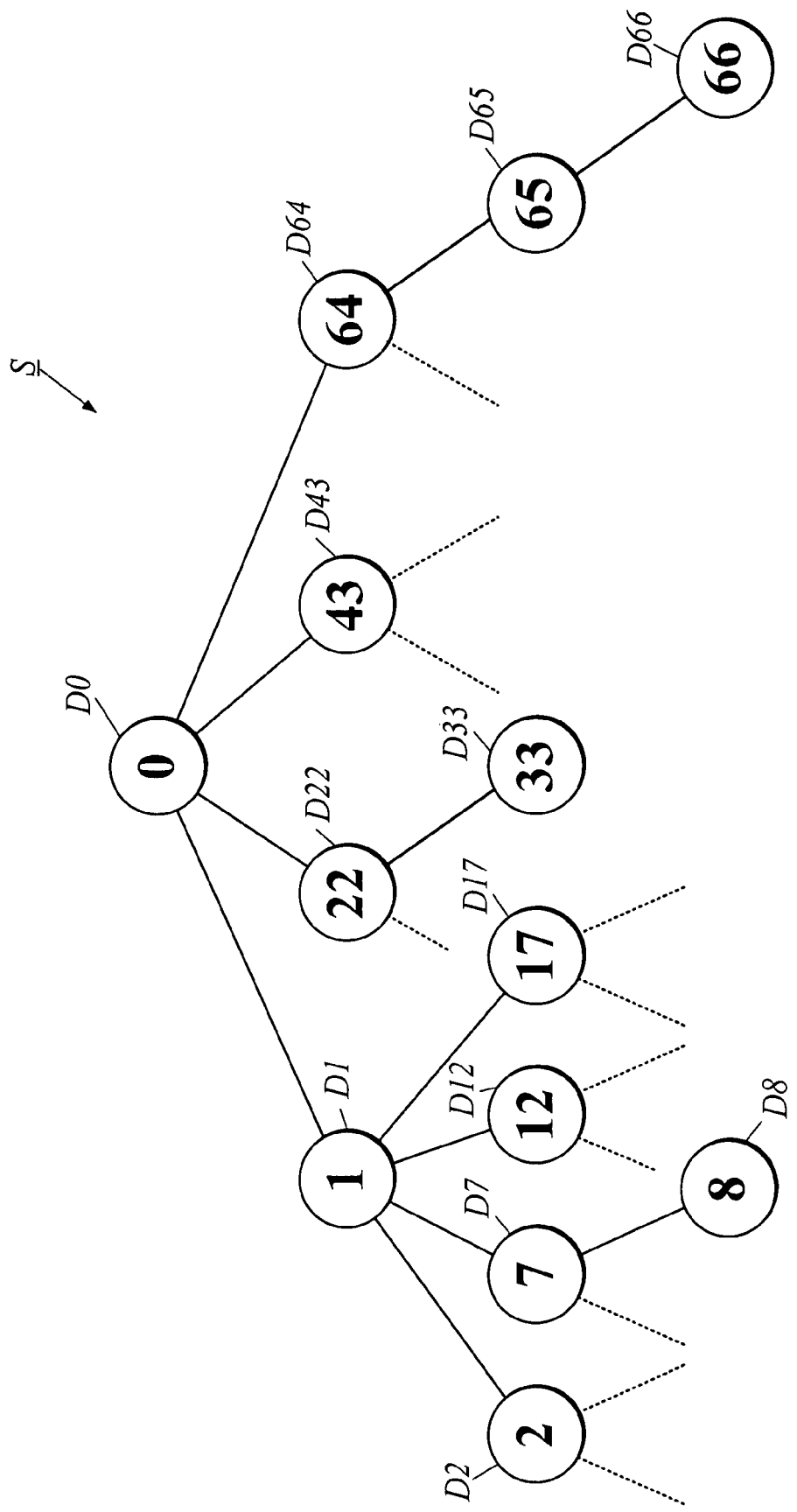
FIG. 2 This is a view illustrating an example of a tree structure of a network system.
Figure 3:
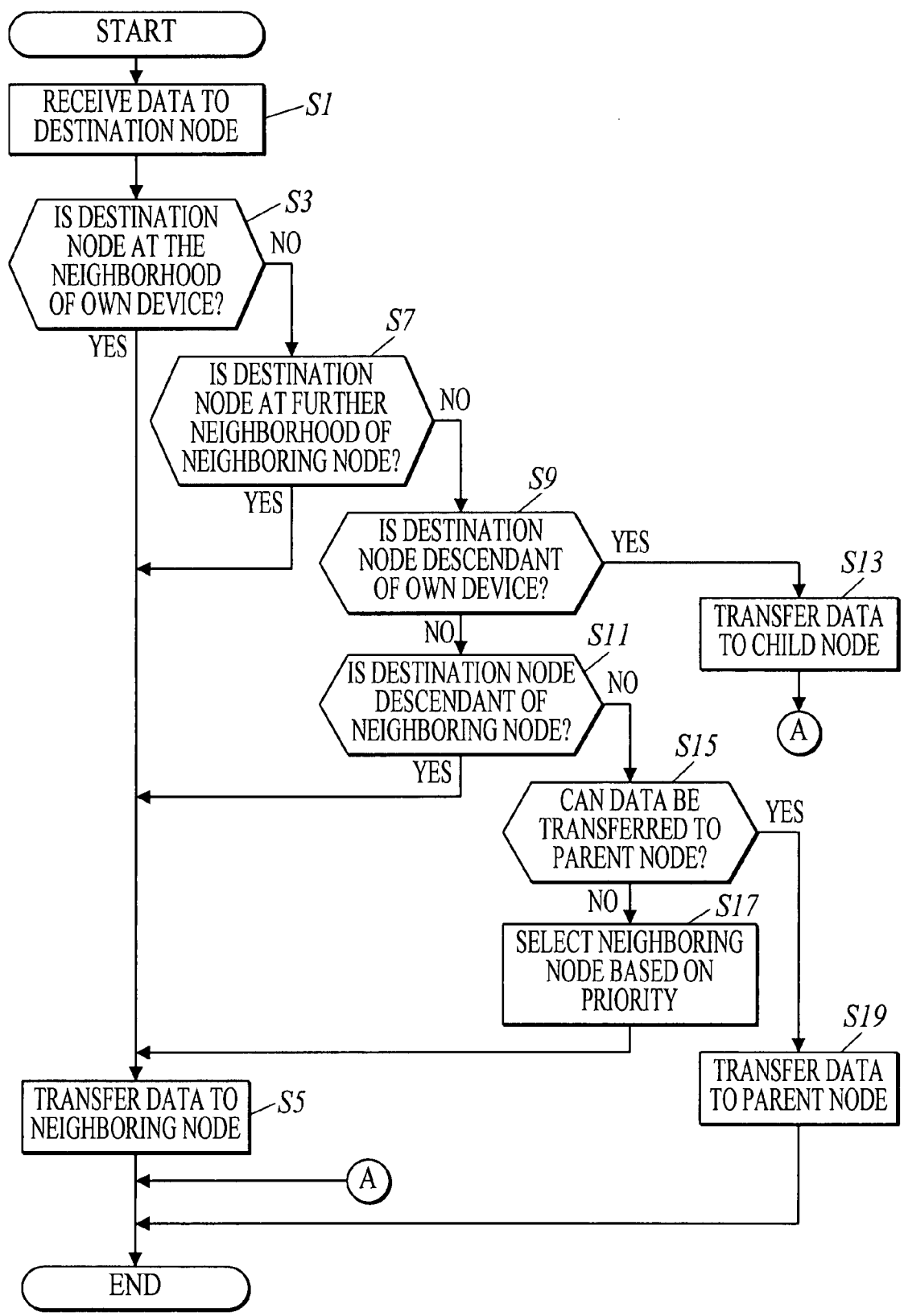
FIG. 3 This is a flowchart for explaining a specific operation of a wireless device.

In this embodiment, the wireless devices D are hierarchized and are connected to a network, and a network system S is constructed as shown in FIG. 2. The network system S forms a tree network in which the zeroth to sixty sixth wireless devices D0 to D66 are hierarchized and connected. It is noted that the wireless devices D0 to D66 have the same functional structure as that of the wireless device D as shown in FIG. 1.

The top layer (route) of the network system S is the zeroth wireless device D0 and the zeroth wireless device D0 is connected to the first wireless device D1, the twenty second wireless device D22, the forty third wireless device D43, and the sixty forth wireless device D64 at the lower layer thereof. The lower layer of these devices is further connected to wireless devices.

When the relation among the respective wireless devices hierarchized as described above is compared to a parent-child relationship, a wireless device connected at the higher layer of a certain wireless device via a network is referred to as "parent node" and a wireless device connected at the lower layer of the certain wireless device is referred to as "child node", and a wireless device connected at a further lower layer is referred to as "grandchild node". Hereinafter, the embodiment will be explained.

[Functional Structure of Wireless Device]

First, with reference to FIG. 1, the functional structure of the wireless device D will be described. As shown in FIG. 1, the wireless device D comprises a control unit 1, a wireless communication unit 11 and a memory unit 21.

The wireless communication unit 11 comprises an antenna 15 and a demodulating circuit, a modulating circuit (not shown) and the like, to realize a wireless control function 13. The wireless communication unit 11 demodulates a radio signal received via the antenna 15 by the wireless control function 13 to generate digital data and to output the digital data to the control unit 1. The wireless communication unit 11 also modulates transmission data based on the control from the control unit 1 to transmit the data to another device. The memory unit 21 is a readable and writable memory area having a RAM, a flash memory or the like.

The control unit 1 comprises a central processing unit (CPU), a read only memory (ROM), a random access memory (RAM) or the like to control and manage the wireless device D in an integrated manner. Specifically, the CPU reads a program stored in the ROM to perform the processing in accordance with the program. Then, based on the processing result, the CPU performs a data processing or communication with another wireless device.

The control unit 1 memorizes an application program unique to the wireless device D to realize an application function 3 by a processing based on the program. The application function 3 detects a data transmission request from a user or a transfer request from another device or the like to perform data transmission based on a TCP/IP transmission system. Then, header information including a network address of a wireless device as a destination of the transmitted data (hereinafter referred to "destination node") is added to the transmission data.

Based on the network address included in the data transmitted from another device, the control unit 1 also determines whether the data is destined for the own device of the control unit 1 or not. When the data is destined for the own device, the control unit 1 performs a processing, such as memorization of the data, response to another device or the like. When the data is destined for another device, a data transfer/routing function 9 which will be described later, selects an appropriate communication path to transfer the data to any of another neighboring communicable wireless device (hereinafter referred to as "neighboring node"), a parent node, and a child node.

The control unit 1 acquires the network information of the parent node, the child node, and the neighboring node (network address, hierarchy information) by a network function 5 having a parent-child relationship management function 7 and the data transfer/routing function 9 in order to select an appropriate communication path based on these pieces of information and to transmit the data.

Specifically, by the parent-child relationship management function 7, neighboring nodes are searched when a network with another device is formed. Among the searched neighboring nodes, a parent node and child nodes are determined to form a tree network. Then, the network information of the parent node and the child nodes of the own device and the network information of the neighboring nodes are collected and are memorized by the memory unit 21 to manage the information. The parent node and the child nodes may be determined by a user or may be allocated by optimization.

A method for searching neighboring nodes may be a method using the scan function based on IEEE802.15.4 wireless standard. This scan function is a function by which a wireless communicable device actively or passively transmits a synchronization signal. By using this function, the arbitrary number of neighboring nodes existing within a range in which radio wave can reach is searched. It is noted that other known techniques also may be appropriately used as a method for searching neighboring nodes.

The control unit 1 causes the network information acquired by the parent-child relationship management function 7 to be memorized as parent-and-child-node information 23 and the first neighboring node information 31 in the memory unit 21. It is noted that, with regards to a timing and a frequency for acquiring the parent-and-child-node information 23 and the first neighboring node information 31, the parent-and-child-node information 23 and the first neighboring node information 31 may be acquired when a network is formed or also may be periodically acquired and updated for example. The acquisition method can be appropriately changed depending on the operation or configuration of the network system S.

The parent-and-child-node information 23 is network information 25 of the parent node, the child node, and the grandchild node of the own device and includes a network address 27 which is IP address or MAC address and hierarchy information 29 representing the layer number in the hierarchy of the network system S.

The first neighboring node information 31 includes: an network address 35 and hierarchy information 37 as network information 33 for every neighboring node; parent-and-child-node information 39; and the second neighboring node information 41. The parent-and-child-node information 39 of the first neighboring node information 31 is network information of a parent node and a child node of a neighboring node and is acquired from a neighboring node and memorized through the communication with the neighboring nodes. The second neighboring node information 41 is network information for a wireless device (the second neighboring node) to which the neighboring node can communicate. When the neighboring node communicates, the first neighboring node information is acquired from the neighboring node and is memorized.

Based on the acquired network information, the control unit 1 selects an appropriate communication path to realize the data transfer/routing function 9 for transferring the data to a neighboring node, a parent node, or a child node. Here, with reference to the flowchart of FIG. 3, details of the data transfer/routing function 9 will be described.

[Details of Data Transfer/Routing Function]

First, when the control unit 1 receives data to be transmitted to a destination node as a hookup node for hooking up data (Step S1), the control unit 1 compares the network address 27 of the first neighboring node information 31 with the network address of the received data to determine whether the neighboring node is a destination node or not (Step S3). When it is determined that the neighboring node is a destination node (Step S1; Yes), the control unit 1 transfers the received data to the neighboring node (Step S5).

When it is determined that the neighboring node is not a destination node, (Step S3; No), the control unit 1 determines whether the destination node is connected to a further neighborhood of the neighboring node or not based on the network address of the second neighboring node information 41 (Step S7). When it is determined that the destination node is connected to a further neighborhood of the neighboring node (Step S7; Yes), the control unit 1 transfers the data to the neighboring node (Step S5).

In Step S7, when it is determined that the destination node is not connected to a further neighborhood of the neighboring node (Step S7; No), the control unit 1 determines whether a child node and a grandchild node of the own device are a destination node or not based on the network address 27 of the parent-and-child-node information 23 (Step S9). When it is determined that the child node and the grandchild node are the destination node (Step S9; Yes), the control unit 1 transfers the data to the child node (Step S13). It is noted that, when the grandchild node is the destination node, the data will be transferred to the child node for a hookup between the own device and the grandchild node, and the child node will transfer the data to the grandchild node.

When it is determined that the child node and the grandchild node are not the destination node (Step S9; No), the control unit 1 determines whether a child node and a grandchild node of a neighboring node are a destination node or not based on the parent-and-child-node information 39 of the first neighboring node information 31 (Step S11). When the control unit 1 determines that a child node and a grandchild node of a neighboring node are a destination node (Step S11; Yes), the control unit 1 transfers the data to the neighboring node (Step S5). In this case, the neighboring node will function as a hookup to transfer the data to a child node of the neighboring node.

When it is determined that a child node and a grandchild node of a neighboring node are not a destination node (Step S11; No), whether the data can be transferred to a parent node of the own device or not is determined (Step S15). If the data can be transferred to the parent node of the own device, the data is transferred to the parent node (Step S19). It is noted that any appropriate known method may be used to determine whether the data can be transferred or not. For example, it may be determined that the data can be transferred when interactive communication with a parent node is carried out and a reply is received from the parent node. Alternatively, it may be determined that the data can be transferred when a signal value of a radio wave transmitted by the parent node is equal to or higher than a predetermined value.

When the control unit 1 determines that the data cannot be transferred to the parent node (Step S15; No), the control unit 1 selects a wireless device satisfying the following selection conditions from among neighboring nodes (Step S17) to transfer the data to the selected neighboring node (Step S5). When there are a plurality of wireless devices satisfying the selection conditions, the selection conditions are increased to select an optimal wireless device for transferring the data.

(Condition 1) Parent node must be different from parent node of the own device.

First, the control unit 1 compares the parent-and-child-node information 23 with the parent-and-child-node information 39 of the first neighboring node information 31 to select a neighboring node of which parent node is different from the parent node of the own device. In the case of a tree network, when a child node and a grandchild node are not a destination node, parent nodes are sequentially followed to increase the number of wireless devices as descendants and to expand a scope within which the destination node can be searched. When the data cannot be transferred to the parent node, a scope within which the destination node can be searched cannot be expanded. Thus, the data can be transferred to neighboring nodes having no common parent node to expand a scope within which the destination node can be searched.

(Condition 2) A layer of hierarchy in network system S is the lowest.

When there are a plurality of neighboring nodes satisfying Condition 1, the control unit 1 selects a neighboring node at a layer having the minimum layer number in the hierarchy of the network system S based on the hierarchy information 37 of the first neighboring node information 31. The reason is that a scope within which the destination node can be searched can be expanded by assuming a wireless device at a layer in the hierarchy of the tree network, which is close to the route, as a starting point.

(Condition 3) Communication sensitivity is good.

When there are a plurality of neighboring nodes satisfying Condition 1 and Condition 2, the control unit 1 selects a neighboring node having the best communication sensitivity with these neighboring nodes. The reason is that a neighboring node having a higher communication sensitivity has a higher data transfer reliability. It is noted that a communication sensitivity is determined by, for example, receiving radio waves transmitted from the respective neighboring nodes to select a neighboring node having the maximum signal value of the radio wave as a neighboring node having the best communication sensitivity.

[Specific Operation of Network System]

Figure 4:
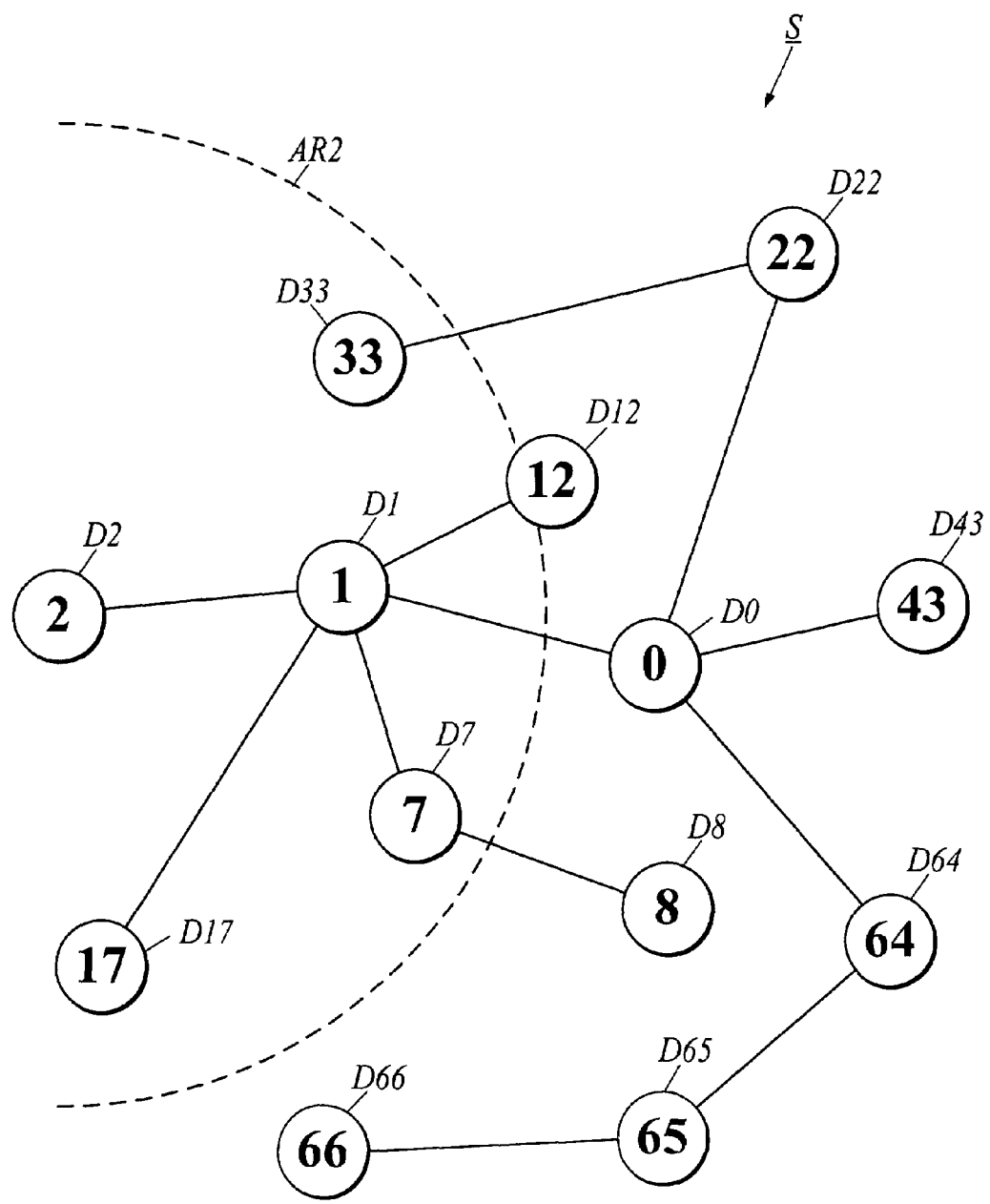
FIG. 4 This is a view illustrating an example of a layout of each wireless device of a network system.

Next, the zeroth wireless device D0 to the sixty sixth wireless device D66 shown in FIG. 2 are arranged in the layout as shown in FIG. 4. A specific operation of the network system S, which is carried out when data is transferred from the second wireless device D2, will be explained.

First, the second wireless device D2 acquires the parent-and-child-node information 23 and the first neighboring node information 31 when the network is formed. As shown in FIG. 2, the parent node of the second wireless device D2 is the first wireless device D1 and thus the network information of the first wireless device D1 is memorized as the parent-and-child-node information 23. It is noted that, although FIG. 2 does not show a child node of the second wireless device D2, when the second wireless device D2 is connected with a child node, the network information of the child node is also memorized as the parent-and-child-node information 23.

In FIG. 4, the second wireless device D2 can communicate with a wireless device existing in a communicable range AR2 and memorizes network information of the seventh wireless device D7, the seventeenth wireless device D17, and the thirty third wireless device D33 as neighboring nodes, as the network address 35 and the hierarchy information 37 of the first neighboring node information 31. The second wireless device D2 also acquires network information of wireless devices at parent and child nodes and child nodes of each of the seventh wireless device D7, the seventeenth wireless device D17, and the thirty third wireless device D33, and network information of wireless devices to which each device can communicate, from each device in order to memorize the information as the parent-and-child-node information 39 of the first neighboring node information 31 and the second neighboring node information 41.

Figure 5:
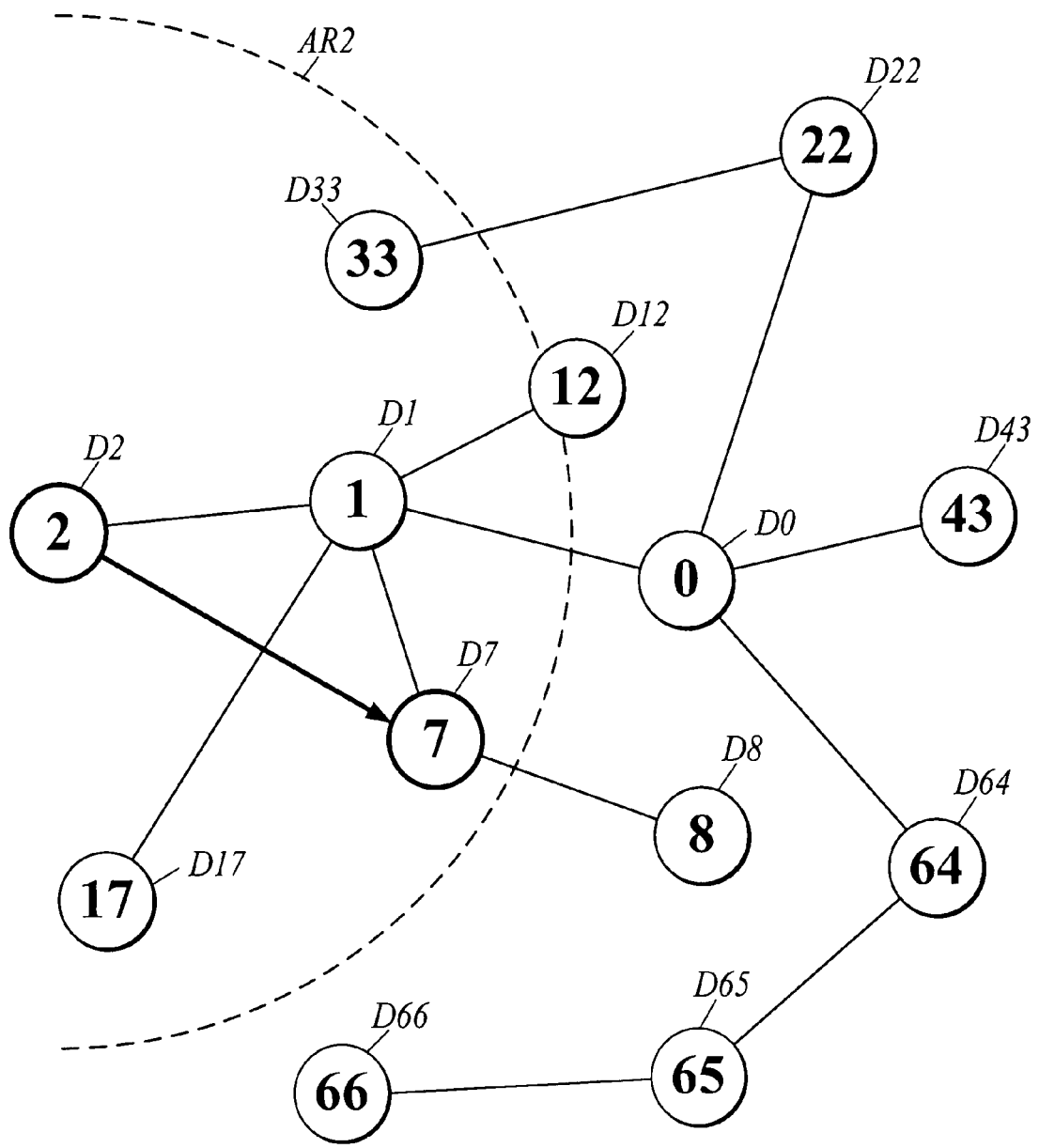
FIG. 5 This is the first diagram illustrating a data transfer step of a network system.

When the data transmitted from the second wireless device D2 is destined for the seventh wireless device D7, the second wireless device D2 determines that the seventh wireless device D7 of the neighboring node is a destination node based on the network address 35 of the first neighboring node information 31 to directly transfer the data to the seventh wireless device D7 as shown in FIG. 5.

When data is transferred by using a hierarchy structure of the tree network as in a conventional case, in the case of FIG. 2, the data is transferred in an order of the second wireless device D2, the first wireless device D1, and the seventh wireless device D7 even when a distance communication condition or a radio wave communication condition between the second wireless device D2 and the seventh wireless device is good. Thus, the hop number (the number of wireless devices through which the data is sent) is "1". On the contrary, in this embodiment, because the data can be transferred without passing the first wireless device D1, it is possible to provide an effective data transfer.

When the twenty second wireless device D22 is a destination node, the second wireless device D2 determines that the twenty second wireless device D22 is connected as a parent node of the thirty third wireless device D33 of a neighboring node based on the parent-and-child-node information 39 of the first neighboring node information 31 to transfer the data to the thirty third wireless device D33.

Figure 6:
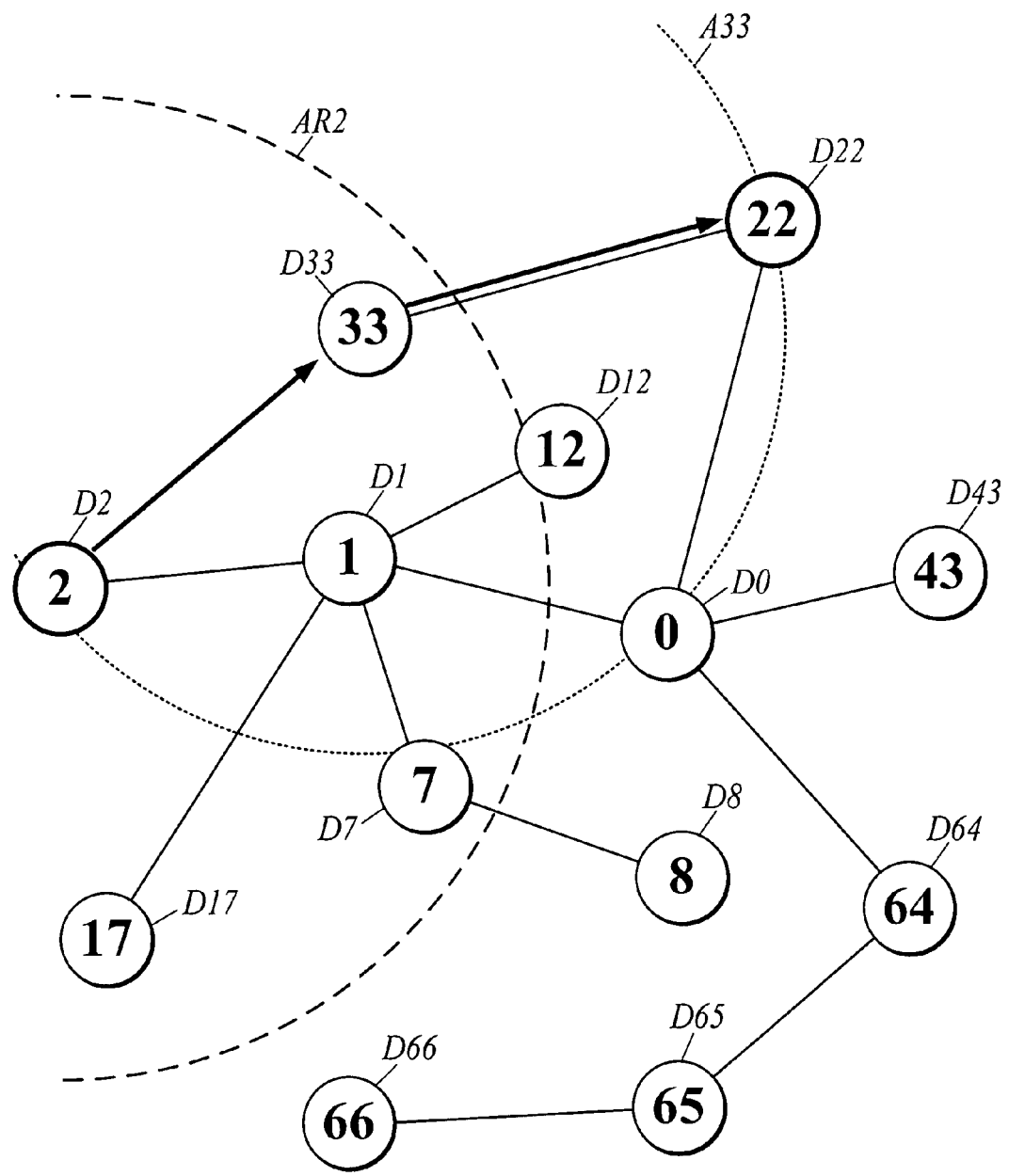
FIG. 6 This is the second diagram illustrating a data transfer step of a network system.

The thirty third wireless device D33 can communicate with another device within a communicable range AR33 shown in FIG. 6 and acquires the network information of the first wireless device D1 and the twelfth wireless device D12 to memorize the network information as the network address 35 and the hierarchy information 37 of the first neighboring node information 31. As the parent-and-child-node information 39 of the first neighboring node information 31 and the second neighboring node information 41, network information of the parent nodes and child nodes of each of the first wireless device D1 and the twelfth wireless device D12 and network information of neighboring nodes are memorized.

When the data is received from the second wireless device D2, the thirty third wireless device D33 determines that the destination node is not connected as a neighboring node but is connected as a parent node to transfer the data to the twenty second wireless device D22.

When data is transferred to a destination node like a conventional case, in FIG. 2, the data is transferred in an order of the second wireless device D2, the first wireless device D1, the zeroth wireless device D0, and the twenty second wireless device D22. Thus, the hop number is "2". On the contrary, in this embodiment, the hop number can be reduced to "1".

In FIG. 6, in case that the thirty third wireless device D33 transfers data to the twenty second wireless device D22 as a parent node, when the data cannot be transferred due to an obstacle, radio disturbance or the like, the thirty third wireless device D33 is cut off from a network connected to the twenty second wireless device D22. The control unit 1 of the thirty third wireless device D33 selects a wireless device in which the twenty second wireless device D22 is not a parent node, from among neighboring nodes. In this case, because the first wireless device D1 and the twelfth wireless device D12 are applicable, the first wireless device D1 provided at a lower layer is selected and the data is transferred thereto. Then, the data is transferred by a hierarchy structure in an order of the first wireless device D1, the zeroth wireless device D0, and the twenty second wireless device D22.

As described above, when the network system S is cut off by communication failure or the like and the data cannot be transferred, a node to which the data is transferred can be newly selected from among neighboring nodes to provide a redundant communication path. When there are a plurality of wireless devices at the lowest layer of the hierarchy, the data can be transferred in a secure manner by selecting a wireless device having the highest communication sensitivity from among the wireless devices.

When a destination node is the sixty sixth wireless device D66, the second wireless device D2 determines that there is no destination node among neighboring nodes based on the parent-and-child-node information 39 of the first neighboring node information 31 to transfer the data to the first wireless device D1 as a parent node.

Figure 7:
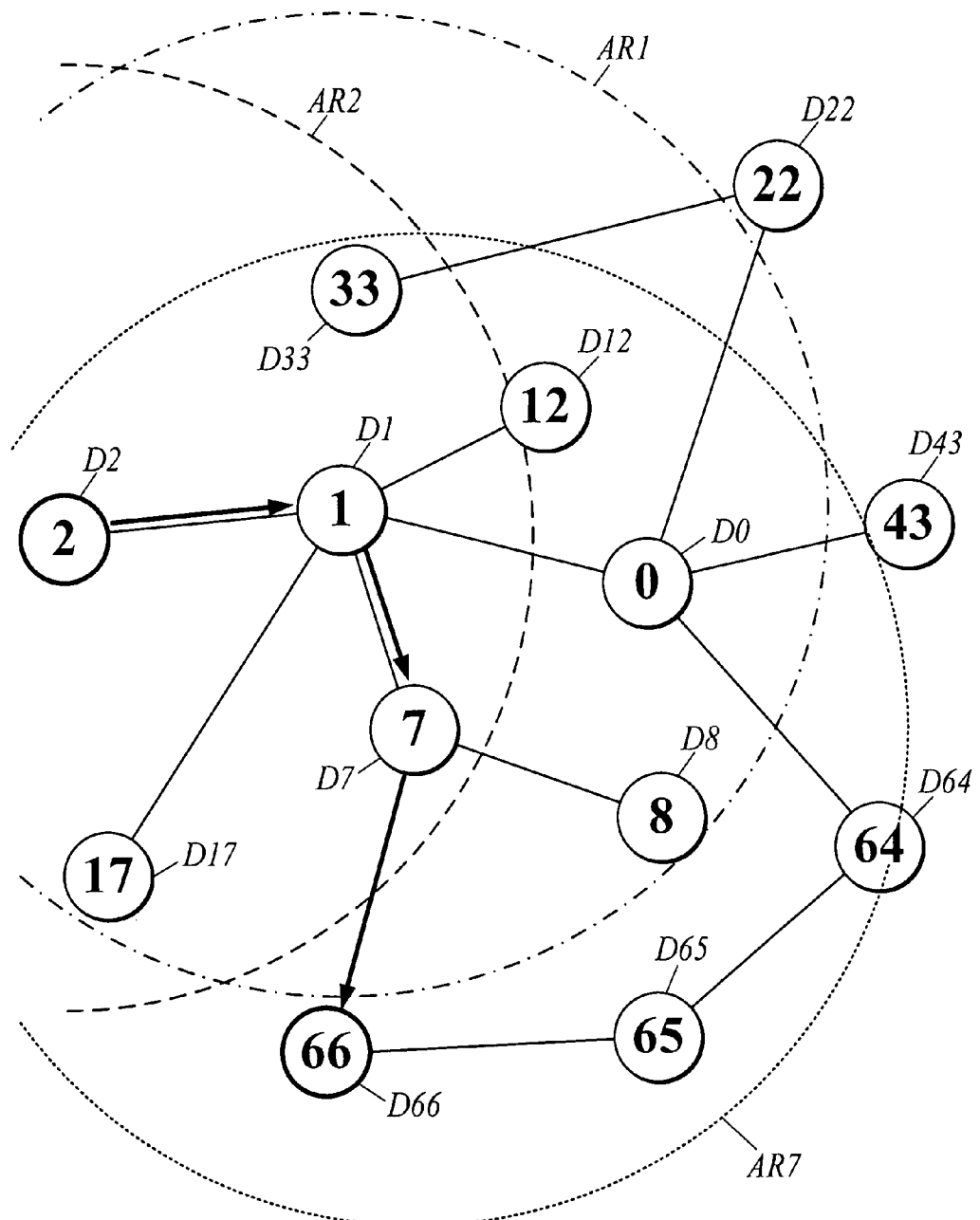
FIG. 7 This is the third diagram illustrating an outline of a data transfer step of a network system.

The first wireless device D1 can communicate within a communicable range AR1 shown in FIG. 7 and memorizes network information of the zeroth wireless device D0, the second wireless device D2, the seventh wireless device D7, the eighth wireless device D8, and the seventeenth wireless device D17, as the first neighboring node information 31. The seventh wireless device D7 can communicate within a communicable range AR7 and memorizes network information of the sixty sixth wireless device D66 as the first neighboring node information 31. Thus, the first wireless device D1 memorizes network information of the sixty sixth wireless device D66 as the second neighboring node information 41.

The first wireless device D1 determines that the sixty sixth wireless device D66 as a destination node exists at the neighborhood of the seventh wireless device D7 based on the second neighboring node information 41 to transfer the data to the seventh wireless device D7. Then, the seventh wireless device D7 determines that the sixty sixth wireless device D66 as a neighboring node is a destination node based on the first neighboring node information 31 to transfer the data to the device.

When data is transferred to a destination node like a conventional case, in FIG. 2, the data is transferred in an order of the second wireless device D2, the first wireless device D1, the zeroth wireless device D0, the sixty forth wireless device D64, the sixth fifth wireless device D65, and the sixty sixth wireless device D66. Thus, the hop number is "4". On the contrary, in this embodiment, the hop number is reduced to "2", and it is possible to provide an effective data transfer.

As described above, according to this embodiment, network information of another communicable device (neighboring node) is acquired in advance. In case that a neighboring node is a destination node when data is transferred to the destination node, the data is transferred to the neighboring node. Thus, when the destination node exists at the neighborhood, the data can be directly transferred without sequentially following the hierarchy structure of the tree network. Therefore, the hop number of the communication path can be reduced, and it is possible to improve the data transfer reliability.

When there is no destination node among neighboring nodes, the data is transferred to a parent node and a child node connected to the destination node. Thus, the data can be transferred by the hierarchy structure of the tree network. As described above, based on the network information acquired in advance, a node to which data is transferred is selected from among a neighboring node, a parent node, and a child node. Therefore, it is possible to transfer the data via an optimal communication path.

When data cannot be transferred to a parent node, a neighboring node that satisfies selection conditions, such as a neighboring node having a different parent node, a neighboring node provided at the lowest layer of the hierarchy, and a neighboring node having a good communication sensitivity, is selected to transfer the data thereto. Therefore, when the device is cut off from the network system S due to defective communication or the like, a neighboring node by which a scope within which the destination node can be searched can be expanded, can be selected to transfer the data thereto. Thus, the communication failure is prevented from being critical to the entire network. Further, the network can be immune to communication failures and the robustness can be improved.

For example, when a wireless device is driven by battery, it is assumed that the device failure is caused due to battery exhaustion with a high frequency. However, because the robustness of the network system S is improved, it is also possible to contribute to the improvement of the availability of the wireless network. When the communication path among wireless devices is fixed, there is high possibility that the communication may be unstable due to an obstacle or radio disturbance. However, the unstable communication caused due to the changing communication environment can be avoided by dynamically selecting another communicable device to provide a redundant transfer path as described in this embodiment. As a result, it is possible to improve the reliability of the network system S and to provide a stable communication quality.

For example, even when the network system S is structured by providing wireless devices at the field (outdoor) and when the network system S is temporarily stopped for the purpose of the maintenance of a certain wireless device, the influence of the maintenance can be suppressed because the search of a destination node is started from a neighboring node. Furthermore, at the recovery after the maintenance, a person's operation, such as retention or recovery of network information, is not required. Therefore, the maintenance of the network system S can be improved. The improved robustness, reliability, and maintenance as described above lead to the improvement of the operation cost, such as convenience, reduced maintenance cost or the like.

Although in the above-described embodiment, it is described that a neighboring node satisfying the selection conditions is selected when data cannot be transferred to a parent node, for example, the following flow also may be used. Specifically, when the data is transferred to a child node in Step S9, whether data can be transferred to the child node or not is determined. When it is determined that the data cannot be transferred, a neighboring node satisfying the above-described selection conditions is selected.

Therefore, for example, in case that communication failure is caused when data is transferred from the seventh wireless device D7 to the eighth wireless device D8 in FIG. 7, the data can be transferred to the zeroth wireless device D0 having a different parent node and provided at the lowest layer of the hierarchy and the data can be transferred from the zeroth wireless device D0 to the eighth wireless device D8 at a neighboring node. Thus, the data can be transferred even to a child node isolated from the network system S.

Although a case in which a tree network is formed by connecting a plurality of wireless devices D, is described, the present invention can be applied so long as the network is a multihop network.

[Practical Example: Plant Diagnosis System]

Figure 8:
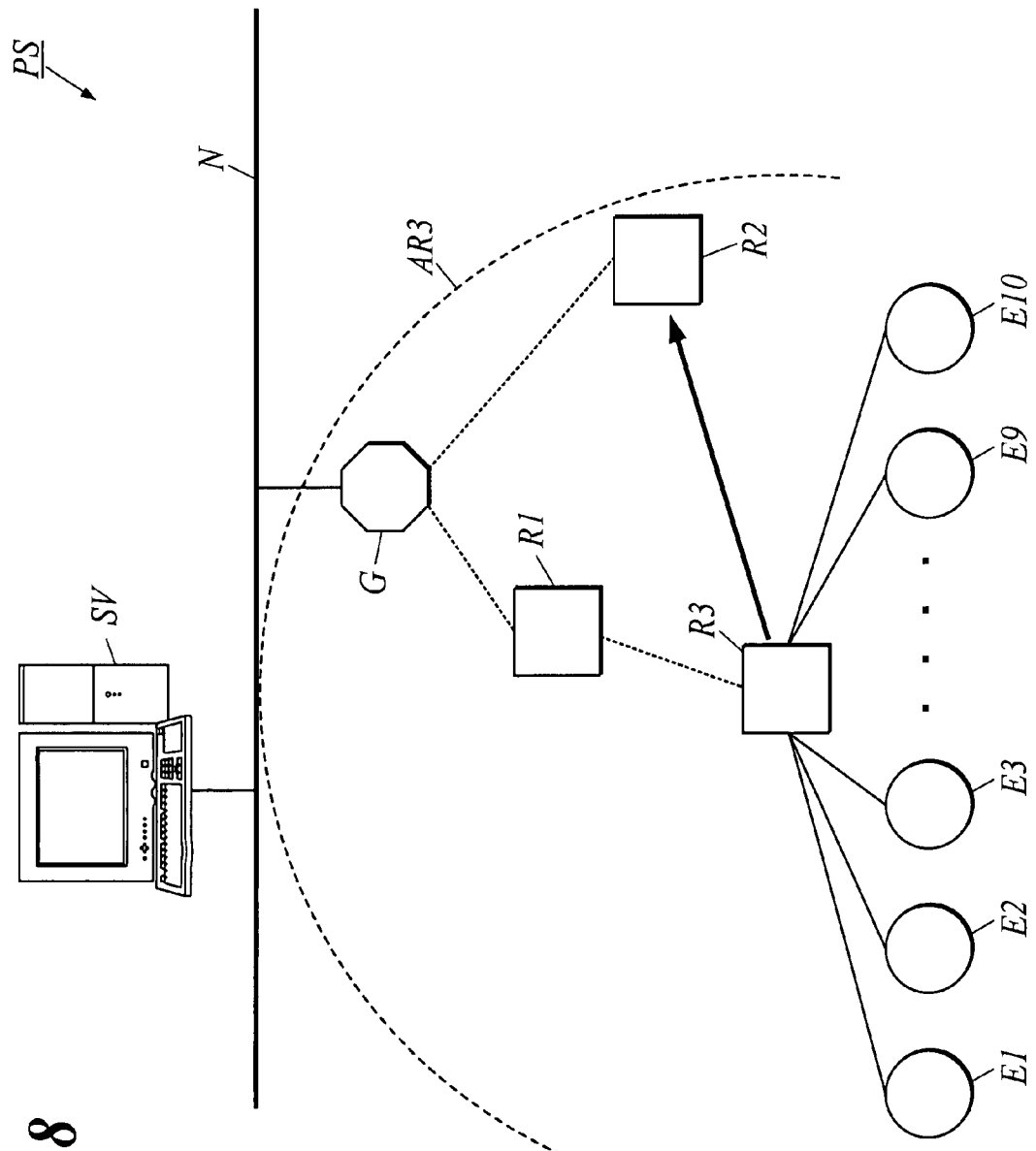
FIG. 8 This is a block diagram illustrating a system configuration of a plant diagnosis system.

Next, a practical example of the network system S will be described. FIG. 8 is a block diagram illustrating the outline of a system configuration in case that the network system S is practically used as a plant diagnosis system PS.

The plant diagnosis system PS is structured so that a data collection server SV and a gateway device G are connected to a backbone network N. The plant diagnosis system PS is a Factory Automation/Plant Automation (FA/PA) system in which information for the diagnosis for pipings provided in a plant building is collected from sensor devices E1 to E10 to a data collection server SV.

As shown in FIG. 8, the lower layers of the gateway device G include the first to third hookup devices R1 to R3 that are wirelessly connected to one another. The first to third hookup devices R1 to R3 and the gateway device G are realized by the same structure as that of the above-described wireless device D. Specifically, the first to third hookup devices R1 to R3 and the gateway device G form a tree network corresponding to the network system S.

Each of the sensor devices E1 to E10 diagnoses the flow statuses of the pipings in the plant and the like to transmit the diagnosis results to the third hookup device R3. The third hookup device R3 receiving the diagnosis result assumes the gateway device G as a destination node and transmits the diagnosis result to the first hookup device R1 as a parent node. Even when communication failure is caused between the first hookup device R1 and the third hookup device R3, because the third hookup device R3 newly changes the destination node to the second hookup device R2 as a neighboring node within the communicable range AR3, the diagnosis result can be transferred to the gateway device G.

When the building extends in a wide range, it is generally difficult to form a network structure via wire communication and the use of a tree network which can perform communication in a wide range is considered. However, because there are a great number of facilities (obstacles) and the network tends to be exposed to radio disturbance in a plant building in which wireless devices are provided, wireless communication tends to be unstable. By applying the network system S of this embodiment, even when disturbance is caused in the communication path due to a change in an environment in the plant building, it is possible to enhance the robustness and the reliability of the plant diagnosis system PS by restructuring the network. Thus, a new added value (service) can be provided such as diagnosis of many facilities in a large plant.

[Practical Example: Building Automation System]

Figure 9:
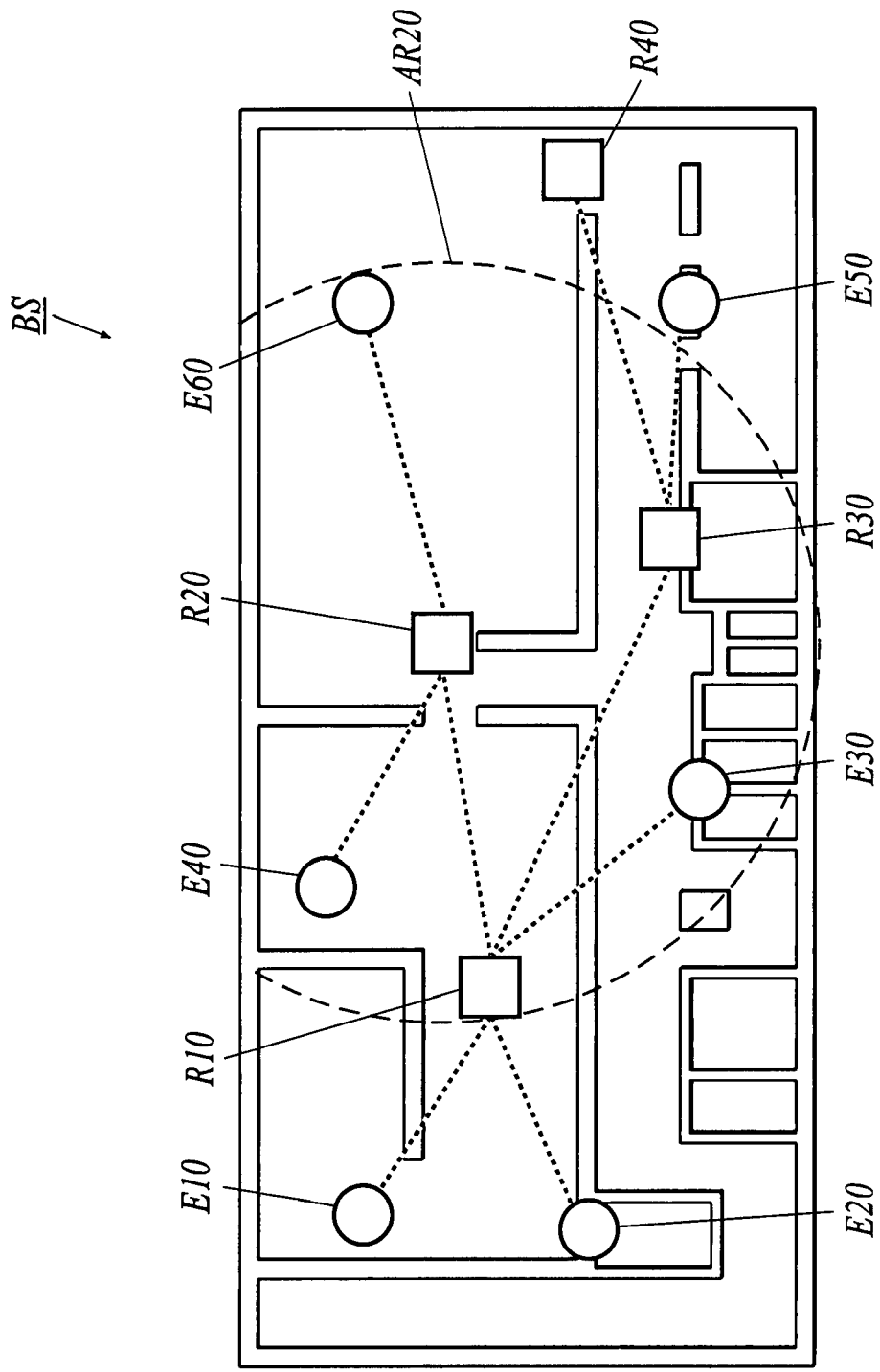
FIG. 9 This is a block diagram illustrating an outline of a system configuration of a building automation system.
Figure 10:
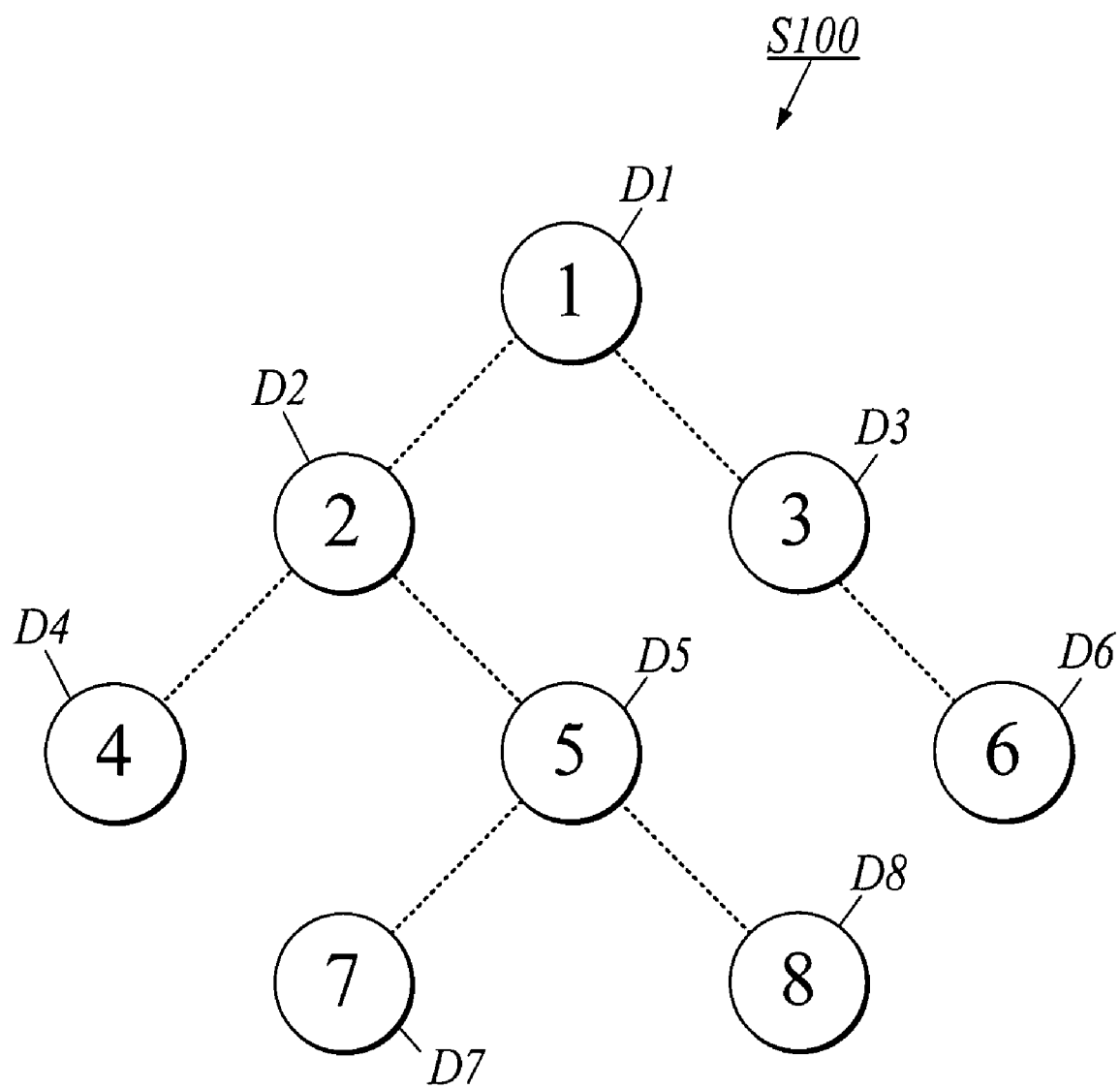
FIG. 10 This is a block diagram illustrating an outline of a system configuration of a network system.

FIG. 9 is a block diagram illustrating the outline of a system configuration in case that the network system S is practically used as a building automation system BS. This building automation system BS is a system for automating operation of various apparatuses, such as lighting apparatuses and air-conditioning apparatuses, in the building by attaching wireless devices to the apparatuses.

The building automation system BS is structured so that the first to sixth sensor devices E10 to E60 and the first to fourth hookup devices R10 to R40 are connected wirelessly. The first hookup device R10 has the first to third sensor devices E10 to E30 and the second and the third hookup devices R20 and E30 as child nodes. The second hookup device R20 has the fourth and sixth sensor devices E40 and E60 as child nodes and the third hookup device R30 has the fourth hookup device R40 and the fifth sensor device E50 as child nodes, respectively. Specifically, the first hookup device R10 is a device at a top layer (route) corresponding to the zeroth wireless device D0 of the network system S.

The first to sixth sensor devices E10 to E60 are attached to lighting apparatuses to coordinate their ON/OFF operations, respectively. For example, when a switch of a lighting apparatus of the third sensor device E30 is turned ON, all lightings of lighting apparatuses attached to the first to fourth sensor devices E10 to E40 are controlled and coordinated so as to be turned ON. The lightings can be controlled so as to be turned ON/OFF when a person enters or leaves a room by attaching motion sensors or the like to the sensor devices.

For example, when the sixth sensor device E60 transfers data to the third hookup device R30, since network information of the third hookup device R30 existing within the communicable range AR20 is acquired in advance, the data can be directly transferred to the third hookup device R30 without transferring the data to the second hookup device R20 as the parent node.

Generally, in the issue of life cycle cost (LCC) in building management, it is important to reduce the running cost by performing energy management and a wireless technique can be effectively used. In this case, to adapt a tree network by which a wide network is easily formed is also reasonable. However, the communication is easily unstable when a specific place in the floor is overcrowded or when the equipments, such as a white board or a partition, are provided. Thus, by applying the network system S of this embodiment, even when communication failure is caused, a neighboring node is sequentially selected depending on the change in the communication environment. Therefore, it is possible to enhance the robustness and the communication stability of the network.

The network system S also may be practically used as a field monitoring system (not shown) for collecting and monitoring information, such as sensor data, image, sound or the like. In a field monitoring network system, generally, a communication environment frequently changes due to a change in the environment, such as change in weather or natural environment, construction of new building, and due to the limitation unique to a wireless device (radio wave characteristic, power source life). Furthermore, the maintenance of the wireless devices may be frequently carried out when the system is structured so that wireless devices are arranged in an ad hoc manner by using the wireless communication feature. In this case, by applying the network system S of this embodiment, even when a wireless device is temporarily stopped, a neighboring node can be sequentially selected to transfer data thereto. The maintenance is improved. Furthermore, it is possible to improve the convenience and availability of the system and sophisticated system integration using the ad hoc property of a wireless device is available.

As described above, by applying the tree network-based network system S, it is possible to suggest and provide various types of systems to a wire-connected, star-type, or ring-type network in which it is difficult to form a wide network.

INDUSTRIAL APPLICABILITY

A wireless device and a network system according to the present invention can be applied to the control of a wide area network, such as plant diagnosis, building automation, field monitoring and the like.

EXPLANATION OF REFERENCE NUMERALS

D Wireless device
S Network system
1 Control unit
3 Application function
5 Network function
7 Parent-child relationship management function
9 Routing function
11 Wireless communication unit
13 Wireless control function
15 Antenna
21 Memory unit
23 Parent-and-child-node information
25 Network information
27 Parent-and-child-node information
29 Hierarchy information
31 First neighboring node information
33 Network information
35 Network address
37 Hierarchy information
39 Parent-and-child-node information
41 Second neighboring node information

The invention claimed is:

1. A wireless device connected to a plurality of hierarchized wireless devices via a network, comprising:
   an acquisition unit for acquiring network information of another communicable device in advance;
   a destination determination unit for determining whether the another communicable device is a data transmission destination or not, based on the network information acquired by the acquisition unit;
   a transmission control unit for transmitting data to the another communicable device when the destination determination unit determines that the another communicable device is the data transmission destination, and for transmitting the data to another device connected at a higher layer or a lower layer via the network when the destination determination unit determines that the another communicable device is not the data transmission destination; and
   a transmittability determination unit for determining whether the data can be transmitted to each of other devices connected at a higher layer and at a lower layer via the network,
   wherein the transmission control unit transmits the data to the another communicable device based on the network information when the transmittability determination unit determines that the data cannot be transmitted to the another device at the higher layer or at the lower layer.

2. The wireless device as claimed in claim 1, wherein when there are a plurality of other communicable devices, the transmission control unit selects one communicable device in which a wireless device connected at a higher layer of the one communicable device via the network is different from a wireless device connected at the higher layer of the wireless device of the transmission control unit via the network, and transmits the data to the selected communicable device.

3. The wireless device as claimed in claim 2, wherein when there are a plurality of the selected communicable devices, the transmission control unit further selects a communicable device connected at a layer having a minimum layer number in a hierarchy via the network, from among the selected communicable devices, and transmits the data to the selected communicable device.

4. The wireless device as claimed in claim 3, wherein when there are a plurality of the selected communicable devices, the transmission control unit further selects a communicable device having best communication sensitivity, from among the selected communicable devices, and transmits the data to the selected communicable device.

5. The wireless device as claimed in any of claims 1 to 4, wherein
the network information comprises at least one of: network addresses of wireless devices connected to the another communicable device at a higher layer and a lower-layer via the network; layer number of the another communicable device in a hierarchy of the network; and a network address of a wireless device to which the another communicable device can communicate.

6. The wireless device as claimed in any of claims 1 to 4 wherein the network connection is a connection formed by a tree network.

7. A network system in which a plurality of hierarchized wireless devices are connected to via a network, wherein each of the wireless devices comprises:
an acquisition unit for acquiring network information of another communicable device capable of communicating with the wireless device in advance;
a destination determination unit for determining whether the another communicable device is a data transmission destination or not, based on the network information acquired by the acquisition unit;
a transmission control unit for transmitting the data to the another communicable device when the destination determination unit determines that the another communicable device is the data transmission destination, and for transmitting the data to another device connected at a higher layer or a lower layer via the network when the destination determination unit determines that the another communicable device is not the data transmission destination; and
a transmittability determination unit for determining whether the data can be transmitted to each of other devices connected at a higher layer and at a lower layer via the network, wherein
the transmission control unit transmits the data to the another communicable device based on the network information when the transmittability determination unit determines that the data cannot be transmitted to the another device at the higher layer or at the lower layer.

* * * * *